(12) United States Patent
Lee et al.

(10) Patent No.: US 10,221,991 B2
(45) Date of Patent: Mar. 5, 2019

(54) SWIVELING INDICATOR FOR A DISPLAY

(71) Applicant: SAMSUNG ELECTRONICS CO., LTD., Suwon-si (KR)

(72) Inventors: Chi-woo Lee, Seoul (KR); Sang-won Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 239 days.

(21) Appl. No.: 15/257,360

(22) Filed: Sep. 6, 2016

(65) Prior Publication Data

US 2017/0074452 A1    Mar. 16, 2017

(30) Foreign Application Priority Data

Sep. 10, 2015   (KR) .................. 10-2015-0128195

(51) Int. Cl.
*G01M 1/38*    (2006.01)
*F16M 11/18*   (2006.01)
*F16M 11/08*   (2006.01)
*G05B 15/02*   (2006.01)
*G09G 3/20*    (2006.01)

(52) U.S. Cl.
CPC ............. *F16M 11/18* (2013.01); *F16M 11/08* (2013.01); *G05B 15/02* (2013.01); *G09G 3/2096* (2013.01); *G09G 2320/068* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 9,295,438 B2 * | 3/2016 | Omura | A61B 6/4405 |
| 2008/0185484 A9 | 8/2008 | Suzuki | |
| 2012/0158187 A1 * | 6/2012 | Shin | F16M 11/08 700/275 |
| 2014/0354791 A1 * | 12/2014 | Lee | G06K 9/00228 348/77 |

FOREIGN PATENT DOCUMENTS

| | | |
|---|---|---|
| KR | 1993-0015759 A | 7/1993 |
| KR | 10-2008-0057058 A | 6/2008 |
| KR | 10-2008-0092037 A | 10/2008 |
| KR | 10-2011-0071546 A | 6/2011 |

* cited by examiner

Primary Examiner — Wissam Rashid
(74) Attorney, Agent, or Firm — Sughrue Mion, PLLC

(57) ABSTRACT

Disclosed is a display apparatus including: a display configured to be swiveled; a stand configured to support the display; a driver configured to swivel the display with respect to the stand; a swiveling indicator provided within a predetermined swiveling range of the display and shaped to show a swiveling indication value corresponding to a swiveled angle of the display; a sensor configured to sense the swiveling indication value of the swiveling indicator corresponding to the swiveled angle of the display; and a controller configured to determine the swiveled angle of the display based on the swiveling indication value sensed by the sensor and to provide at least one function supported by the display apparatus in accordance with the determined swiveled angle.

18 Claims, 20 Drawing Sheets

SWIVELING INDICATOR FOR A DISPLAY

CROSS-REFERENCE TO RELATED APPLICATION

This application claims priority from Korean Patent Application No. 10-2015-0128195, filed on Sep. 10, 2015 in the Korean Intellectual Property Office, the disclosure of which is incorporated herein by reference in its entirety.

BACKGROUND

Field

Apparatuses and methods consistent with exemplary embodiments relate to a swiveling indicator having a shape to correspond to a swiveled angle of a display and a display apparatus including the same, and more particularly to a swiveling indicator shaped to show a swiveling indication value corresponding to a swiveled angle of a display of a display apparatus, which can be swiveled left and right, and the display apparatus including the same.

Description of the Related Art

A liquid crystal display (LCD), a plasma display panel (PDP), a light emitting diode (LED) and the like display apparatus have been widespread as the display apparatuses become larger and thinner. The reason is because each of such display apparatuses not only displays an image with high quality but also occupies a small space in a room. For example, the display apparatuses may be directly mounted to a wall in the room, or may be installed on a floor in a room or on a table by a separate stand.

However, it is inconvenient for a user to personally swivel or turn the display apparatus whenever his/her screen view position or direction is changed.

SUMMARY

In accordance with an exemplary embodiment, there is provided a display apparatus including: a display; a stand configured to support the display to be swiveled; a driver configured to swivel the display with respect to the stand; a swiveling indicator configured to be arranged within a predetermined swiveling range of the display and have a shape showing a swiveling indication value corresponding to a swiveled angle of the display; a sensor configured to sense the swiveling indication value of the swiveling indicator corresponding to the swiveled angle of the display; and a controller configured to determine the swiveled angle of the display based on the swiveling indication value sensed by the sensor and to provide at least one function supported by the display apparatus in accordance with the determined swiveled angle. Thus, it is easy to determine the swiveled angle of the display.

The swiveling indicator may include a slope indicating surface, height of which increases or decreases within the predetermined swiveling range of the display, and the sensor may sense the increase/decrease in height of the slope indicating surface. Thus, it is easy to determine the swiveled angle of the display corresponding to the slope indicating surface.

The swiveling indicator may include a pitch indicating surface, pitches of which increase or decrease within the predetermined swiveling range of the display, and the sensor may sense the increase/decrease in pitch of the pitch indicating surface. Thus, it is easy to determine the swiveled angle of the display corresponding to the pitch indicating surface.

The swiveling indicator may include a color indicating surface, color tone of which increases or decreases within the predetermined swiveling range of the display, and the sensor may sense the increase/decrease in color tone of the color indicating surface. Thus, it is easy to determine the swiveled angle of the display corresponding to the color indicating surface.

The display apparatus may further include an input unit configured to receive a user's input for adjusting the swiveled angle of the display, and the controller may control the driver to swivel the display in accordance with the swiveled angle of the display corresponding to a user's input received in the input unit. Thus, it is easy to adjust the swiveled angle of the display.

The display may display a user interface for allowing a user to adjust the swiveled angle of the display. Thus, it is easy to adjust the swiveled angle of the display.

The display apparatus may further include a storage configured to store the swiveled angle of the display of when the display apparatus is turned off, and the controller may control the driver to swivel the display to a preset off position when the display apparatus is turned off, and to swivel the display at the stored swiveled angle when the display apparatus is turned on. Thus, a user does not have to adjust the swiveled angle of the display whenever the power is on/off.

In accordance with another exemplary embodiment, there is provided a method of controlling a display apparatus including a display and a stand, the method including: sensing a swiveling indication value of a shape corresponding to a swiveled angle of the display to be swiveled within a predetermined swiveling range with respect to the stand; determining the swiveled angle of the display based on the sensed swiveling indication value; and providing at least one function supported by the display apparatus in accordance with the determined swiveled angle. Thus, it is easy to determine the swiveled angle of the display.

The shape may include a slope indicating surface, height of which increases or decreases within the predetermined swiveling range of the display, and the sensing the swiveling indication value may include sensing the increase/decrease in height of the slope indicating surface. Thus, it is easy to determine the swiveled angle of the display corresponding to the slope indicating surface.

The shape may include a pitch indicating surface, pitches of which increase or decrease within the predetermined swiveling range of the display, and the sensing the swiveling indication value may include sensing the increase/decrease in pitch of the pitch indicating surface. Thus, it is easy to determine the swiveled angle of the display corresponding to the pitch indicating surface.

The shape may include a color indicating surface, color tone of which increases or decreases within the predetermined swiveling range of the display, and the sensing the swiveling indication value may include sensing the increase/decrease in color tone of the color indicating surface. Thus, it is easy to determine the swiveled angle of the display corresponding to the color indicating surface.

The method may further include receiving a user's input for adjusting the swiveled angle of the display, and the providing the at least one function may include swiveling the display in accordance with the swiveled angle of the display corresponding to the received user's input. Thus, it is easy to adjust the swiveled angle of the display.

The method may further include displaying a user interface for allowing a user to adjust the swiveled angle of the display. Thus, it is easy to adjust the swiveled angle of the display.

The method may further include storing the swiveled angle of the display of when the display apparatus is turned off, and the providing the at least one function may include swiveling the display to a preset off position when the display apparatus is turned off, and swiveling the display at the stored swiveled angle when the display apparatus is turned on. Thus, a user does not have to adjust the swiveled.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described with reference to accompanying drawings. The following embodiments have to be considered as illustrative only, and it should be construed that all suitable modification, equivalents and/or alternatives fall within the scope of the inventive concept. Throughout the drawings, like numerals refer to like elements.

In this specification, "have," "may have," "include," "may include" or the like expression refer to presence of the corresponding features (e.g.: numerical values, functions, operations, or elements of parts, and does not exclude additional features.

In this specification, "A or B," "at least one of A or/and B," "one or more of A or/and B" or the like expression may involve any possible combination of listed elements. For example, "A or B," "at least one of A and B," or "at least one A or B" may refer all of (1) at least one A, (2) at least one B, or (3) both at least one A and at least one B.

In this specification, "a first," "a second," "the first," "the second" or the like expression may modify various elements regardless of order and/or importance, and does not limit the elements. These expressions may be used to distinguish one element from another element.

In this specification, the expression of "configured to" may be for example replaced by "suitable for," "having the capacity to," "designed to," "adapted to," "made to," or "capable of" in accordance with circumstances. The expression of "configured to" may not necessarily refer to only "specifically designed to" in terms of hardware. Instead, the "device configured to" may refer to "capable of" together with other devices or parts in a certain circumstance. For example, the phrase of "the processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

In this specification, terms may be used just for explaining a certain embodiment and not intended to limit the scope of other embodiments. A singular expression may involve a plural expression as long as it does not clearly give different meaning contextually. All the terms set forth herein, including technical or scientific terms, have the same meanings as those generally understood by a person having an ordinary skill in the art. Terms defined in a general-purpose dictionary may be construed to have the same or similar meanings as the contextual meanings of the related art, and should not be interpreted as ideally or excessively formal meanings.

Figure 1:
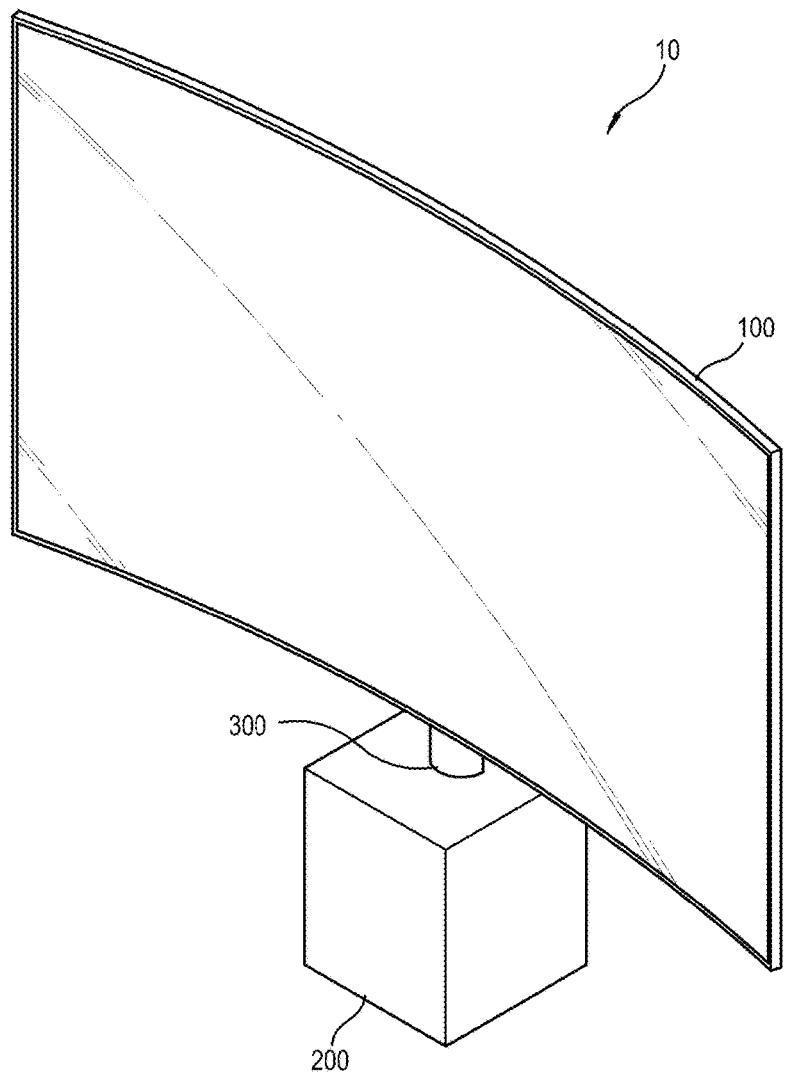
FIG. 1 is a perspective view of a display apparatus according to an exemplary embodiment.
Figure 2:
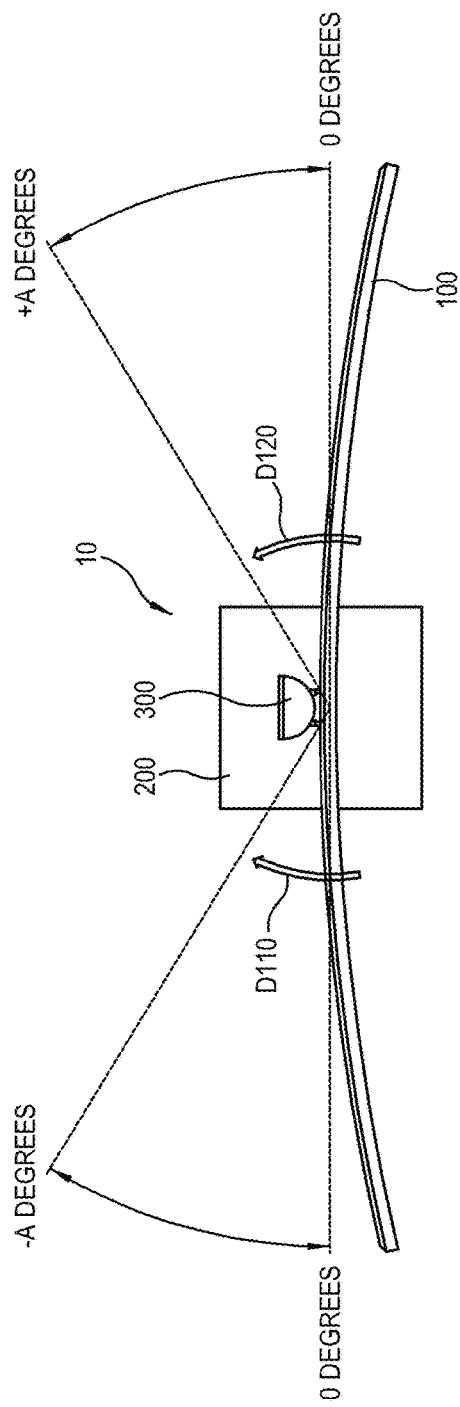
FIG. 2 is a top view of a display apparatus according to an exemplary embodiment.

FIG. 1 and FIG. 2 are a perspective view and a top view, respectively, of a display apparatus 10 according to an exemplary embodiment.

Referring to FIG. 1, a display apparatus 10 may include a display 100, a stand 200 for supporting the display 100 to be swiveled, and a driver 300 for swiveling the display 100 with respect to the stand 200.

Therefore, the display 100 is swiveled left and right with respect to the stand 200. For example, the display 100 may swivel within an angle range from about −45 to +45 degrees. The angle range within which the display 100 can be swiveled may be variously set taking a user's convenience into account. Because the breadth (or left and right width) of the display 100 is relatively longer than the stand 200, the display 100 may be shaken when it is swiveled. In other words, the display 100 may move left and right. The size and weight of the stand 200 may be suitable for preventing the shaking or moving. To this end, a separate weight may be used to secure the proper weight of the stand 200. For example, a metallic frame (e.g. an aluminum bar, not shown) may be added to the stand 200, thereby achieving the necessary weight.

Further, the stand 200 may have a regular hexahedral shape to stably support the display 100. Besides, the stand 200 may have various shapes for stably supporting the display 100. That is, the stand 200 in the exemplary embodiment has a quadrangular cross-section in a horizontal direction, but the exemplary embodiment is not limited thereto. Alternatively, the stand may have triangular, pentagonal or the like polygonal cross-section or a circular or elliptical cross-section in the horizontal direction as long as it can stably support the display 100. Further, the height of the stand 200 may be properly determined so that the display 100 cannot be shaken when the display 100 is swiveled left and right.

The driver 300 may be placed inside the stand 200 so that the display 100 can be swiveled with respect to the stand 200. The driver 300 may include a motor that can rotate forward and backward in order to swivel the display 100 left and right.

Referring to FIG. 2, for example, when the display 100 faces frontward, a swiveled angle of the display 100 is 0 degrees. Then, the display 100 may have a swiveled angle of −A degrees in a clockwise direction D110 and a swiveled angle of +A degrees in a counterclockwise direction D120. For example, the display 100 may be swiveled up to −45 degrees in the clockwise direction D110 and up to +45 degrees in the counterclockwise direction D120. As necessary, the display 100 may swivel within various angle ranges.

Figure 3:
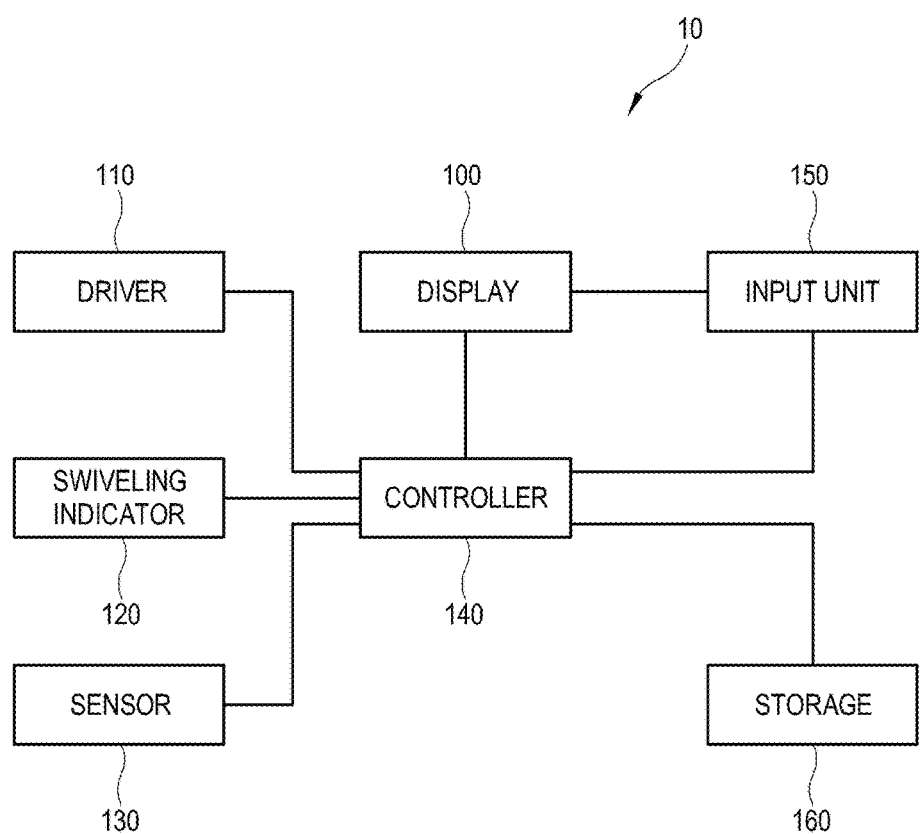
FIG. 3 is a block diagram of a display apparatus according to an exemplary embodiment.

FIG. 3 is a block diagram of a display apparatus 10 according to an exemplary embodiment.

In the exemplary embodiment, the display apparatus 10 may be achieved by a television (TV), but not the exemplary embodiment is limited thereto. Alternatively, the display apparatus 10 according to an exemplary embodiment may be achieved by various apparatuses such as a monitor, a portable multimedia player, a mobile phone, etc. as long as it can display an image based on an image signal/image data received from the exterior or stored therein.

According to an exemplary embodiment, the display apparatus 10 includes the display 100, a driver 110 for swiveling the display 100 with respect to the stand 200, a swiveling indicator 120 arranged along a predetermine swiveling range of the display 100 and shaped to show a swiveling indication value corresponding to a swiveled angle of the display 100, a sensor 130 for sensing a swiveling indication value of the swiveling indicator 120, and a controller 140 for determining the swiveled angle of the display 100 based on the swiveling indication value sensed by the sensor 130 and controlling at least one function supported in the display apparatus 10 in accordance with the determined swiveled angle.

The display 100 of the display apparatus 10 is driven by the driver 110 to swivel within a predetermined swiveling range. At this time, the display apparatus 10 may determine the swiveled angle of the display 100 through the swiveling indicator having a shape showing the swiveling indication value corresponding to the swiveled angle of the display 100.

That is, the swiveling indicator 120 shaped to show a swiveling indication value corresponding to a swiveled angle of the display 100 within a predetermined swiveling range of the display 100 and the sensor 130 for sensing the swiveling indication value of the swiveling indicator 120 are provided to thereby sense the swiveling indication value as the display 100 swivels.

The sensed indication value is transmitted to the controller 140, and the controller 140 determines the swiveled angle of the display 100 based on the received swiveling indication value. The sensed swiveling indication value may be tabulated mapping to the swiveled angle of the display 100, and thus the controller 140 determines the swiveled angle of the display 100 corresponding to the receive swiveling indication value. Thus, the controller 140 provides at least one support function in accordance with the determined swiveled angles.

At least one function provided by the display apparatus 10 in accordance with the determined swiveled angles may include a function of providing content corresponding to the determined swiveled angle. In general, a plurality of users are different in direction of viewing the display 100, and thus the display apparatus 10 may provide content or a content history based on a user's preference to him/her corresponding to the determined swiveled angle. In addition, the display apparatus 10 may display the determined swiveled angle on the display 100, or provide a resolution of the display 100 suitable for the determined swiveled angle.

Further, the controller 140 of the display apparatus 10 may display a user interface (UI) on the display 100 so as to determine the swiveled angle of the display 100 in response to a user's input, and s/he may control the UI through an input unit 150.

Further, the controller 140 of the display apparatus 10 may store the swiveled angle of the display 100 in a storage 160. For example, if a user turns off the display apparatus 10, the controller 140 stores the swiveled angle of the display 100 of when the display apparatus 10 is turned off and swivel the display 100 to a preset off position. Thereafter, if a user turns on the display apparatus 10, the controller 140 swivels the display 100 to the swiveled angle, which is stored when the display apparatus 10 is turned off.

Figure 4:
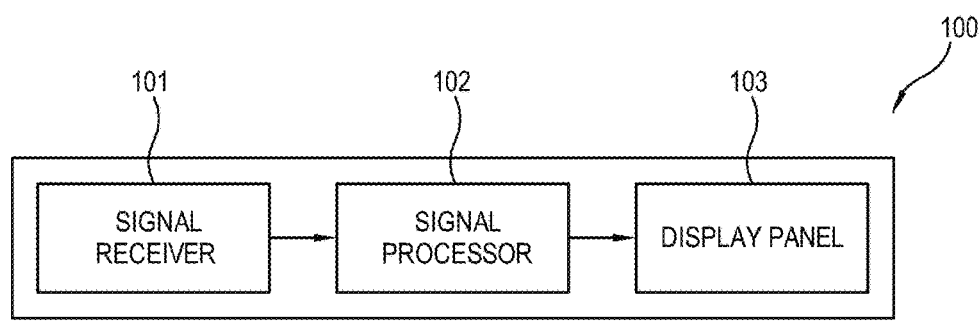
FIG. 4 is a block diagram of a display in the display apparatus according to an exemplary embodiment.

FIG. 4 is a block diagram of a display 100 in the display apparatus 10 according to an exemplary embodiment.

Referring to FIG. 4, the display 100 includes a signal receiver 101 to receive an image signal/image data and transmit it to the signal processor 102. The signal receiver 101 may be variously achieved in accordance with formats of an image signal to be received and the types of the display apparatus 10. For example, the signal receiver 101 may receive a radio frequency (RF) signal from a broadcasting station (not shown) wirelessly, or may receive an image signal complying with composite video, component video, super video, syndicat des constructeurs d'Appareils radiorécepteurs et téléviseurs (SCART), high definition multimedia interface (HDMI), displayport, unified display interface (UDI). If the image signal is a broadcast signal, the signal receiver 101 may include a tuner to be tuned to a channel. Further, the signal receiver 101 may receive an image data packet from a server (not shown) through a network.

The signal processor 102 performs various image processing processes with respect to an image signal received in the signal receiver 101. The signal processor 102 outputs the image signal processed by such a process to a display panel 103, so that the display panel 103 can display an image based on the image signal.

There are no limits to the kind of image processing processes to be performed by the signal processor 102. For example, there are decoding corresponding to an image format of the image data, de-interlacing for converting interlaced-type image data into progressive-type image data, scaling for adjusting the image data to have a preset resolution, noise reduction for improving quality of an image, detail enhancement, frame refresh rate conversion, etc.

The signal processor 102 may be achieved by a system on chip (SoC) where functions for the foregoing processes are integrated, or an image processing board (not shown) that an individual element capable of independently performing each process is mounted to a printed circuit board. The display apparatus 10 is internally provided with the signal processor 102.

The display panel 103 displays an image based on an image signal output from the signal processor 102. In the exemplary embodiment, the display panel 103 has not a non-emissive panel structure such as a liquid crystal display panel but a self-emissive structure. For example, the display panel 103 may be achieved by an organic light emitting diode (OLED) panel or a light emitting diode (LED) panel.

Figure 5:
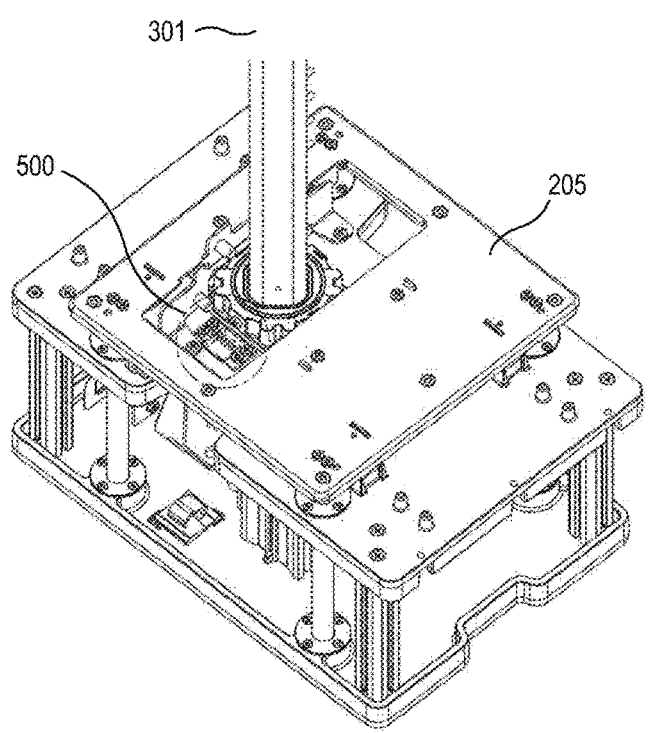
FIG. 5 is a perspective view showing an inner structure of a stand for a display apparatus according to an exemplary embodiment.

FIG. 5 is a perspective view showing an inner structure of a stand 200 for a display apparatus 10 according to an exemplary embodiment.

Referring to FIG. 5, the stand 200 may internally include the driver, the swiveling indicator and the sensor. The driver may include a shaft 301 to be swiveled with respect to a driving axis. The shaft 301 may be made of metal. The shaft 301 may swivel within a range from a first angle (e.g. −45 degrees) to a second angle (e.g. +45 degrees).

In addition, the stand 200 may further include a lifter 205 to make the display 100 move up and down. The lifter 205 may be driven by the driver 300 to move the display 100 up and down. For example, the lifter 205 moves the display 100 up when the display apparatus 10 is turned on, but moves the display 100 down when the display apparatus 10 is turned off.

A region 500 shows the swiveling indicator and the sensor. Below, the swiveling indicator and the sensor will be described in detail with reference to FIG. 6 showing an enlarged view of the region 500.

Figure 6:
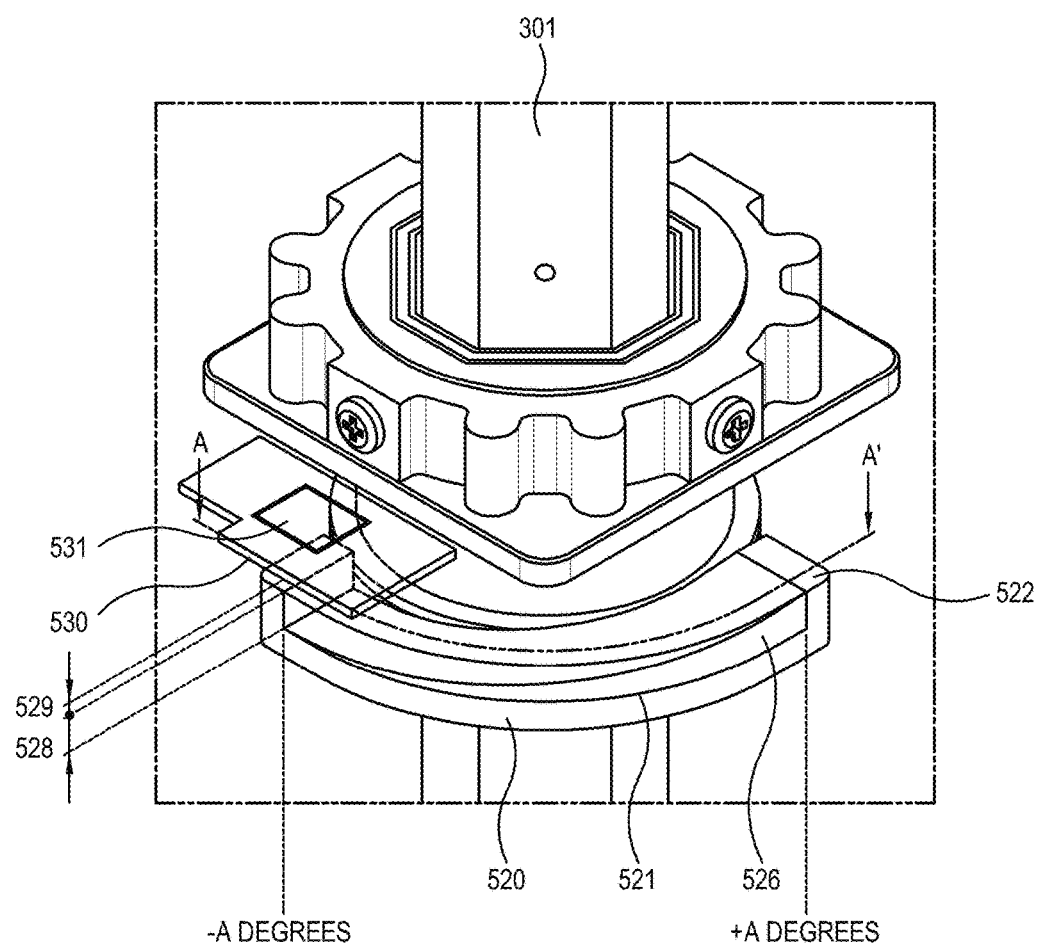
FIG. 6 is a perspective view showing a swiveling indicator and a sensor in a display apparatus according to an exemplary embodiment.

FIG. 6 is a perspective view showing a swiveling indicator 520 and a sensor 530 in a display apparatus 10 according to an exemplary embodiment.

A swiveling indicator 520 is arranged along a predetermined swiveling range of the display 100, and has a shape showing a swiveling indication value corresponding to the swiveled angle of the display 100. If a sensor 530 senses a swiveling indication value of the swiveling indicator 520 as the display 100 swivels, the controller determines the swiveled angle of the display 100 based on the sensed swiveling indication value.

The swiveling indicator 520 may have a shape having a first surface 521, a second surface 522 provided at a position higher than that of the first surface 521, and a slope indicating surface 526 connecting one end 523 (see FIG. 7) of the first surface 521 and one end 524 (see FIG. 7) of the second surface 522. Further, the swiveling indicator 520 is placed around the shaft 301 of the driver 300 along a range from the first angle (e.g. −45 degrees) to the second angle (e.g. +45 degrees) corresponding to a predetermined swiveling range of the display 100.

The sensor 530 is provided at a higher position by a first height 528 and a second height 529 from the first surface 521 the second surface 522, respectively, in a direction perpendicular to the swiveling indicator 520 as shown in the figure. The sensor 530 may be a proximity sensor 531 that outputs a value corresponding to a distance from an object. Therefore, the proximity sensor 531 may output a value corresponding to the first height 528 if the display 100 is swiveled at an angle of −A degrees, and output a value corresponding to the second height 529 when the display 100 is swiveled at an angle of +A degrees.

That is, the swiveling indicator 520 includes the slope indicating surface 526, and shows the swiveling indication value corresponding to the swiveled angle of the display 100 so that the proximity sensor 531 can output a value varied depending on a distance from the slope indicating surface 526.

Figure 7:
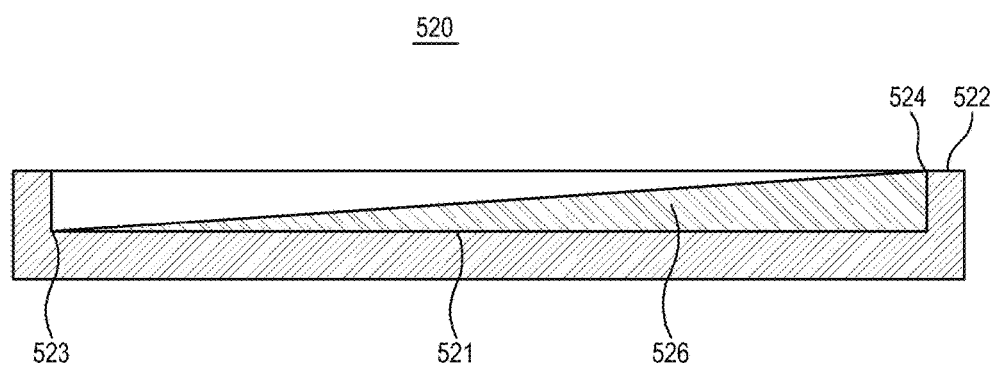
FIG. 7 is a cross-section view of the swiveling indicator taken along line A-A' in FIG. 6.

FIG. 7 is a cross-section view of the swiveling indicator 520 taken along line A-A' in FIG. 6.

Referring to FIG. 7, the swiveling indicator 520 has the slope indicating surface 526 sloping to connect one end 523 of the first surface 521 and one end 524 of the second surface 522. Therefore, the slope indicating surface 526 of the swiveling indicator 520 is used as the swiveling indication value corresponding to the swiveled angle of the display 100.

Figure 8:
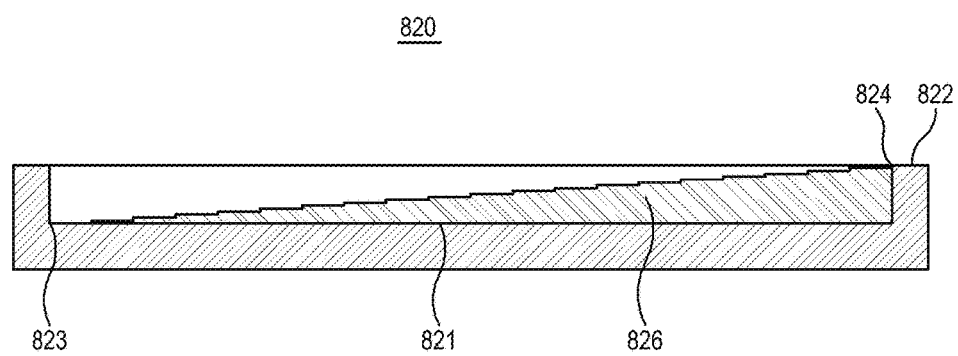
FIG. 8 is a cross-section view of a swiveling indicator in a display apparatus according to an exemplary embodiment.

FIG. 8 is a cross-section view of a swiveling indicator 820 in a display apparatus 10 according to an exemplary embodiment.

Referring to FIG. 8, a swiveling indicator 820 is shaped to include a stepwise indicating surface 826 having a plurality of stepped portions that get higher step by step from one end 823 of a first surface 821 to one end 823 of a second surface 822. The plurality of stepped portions in the stepwise indicating surface 826 may have the same height and the same width with each other. The proximity sensor 531 outputs different values respectively corresponding to the plurality of stepped portions in the swiveling indicator 820, so that the stepwise indicating surface 826 of the swiveling indicator 820 can be used as the swiveling indication value corresponding to the swiveled angle of the display 100.

Figure 9:
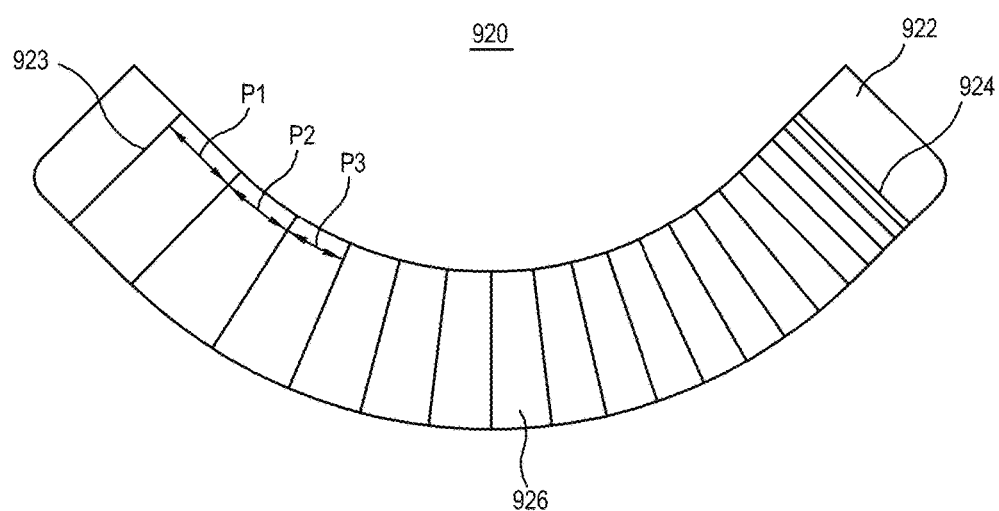
FIG. 9 is a top view of a swiveling indicator of a display apparatus according to an exemplary embodiment.

FIG. 9 is a top view of a swiveling indicator 920 of a display apparatus 10 according to an exemplary embodiment.

Referring to FIG. 9, a swiveling indicator 920 may be shaped to include a pitch indicating surface 926, pitches of which become narrower from one end 923 of the swiveling indicator 920 toward the other end 924. For example, a first pitch P1 the closest to one end 923 is wider than the next second pitch P2, and the second pitch P2 is wider than the next third pitch P3. At this time, the sensor 530 is provided as a sensor for sensing the pitches, and thus the controller determines the swiveled angle corresponding to the pitch varied as the display 100 swivels.

Thus, the pitch indicating surface 926 of the swiveling indicator 920 is used as the swiveling indication value corresponding to the swiveled angle of the display 100.

Figure 10:
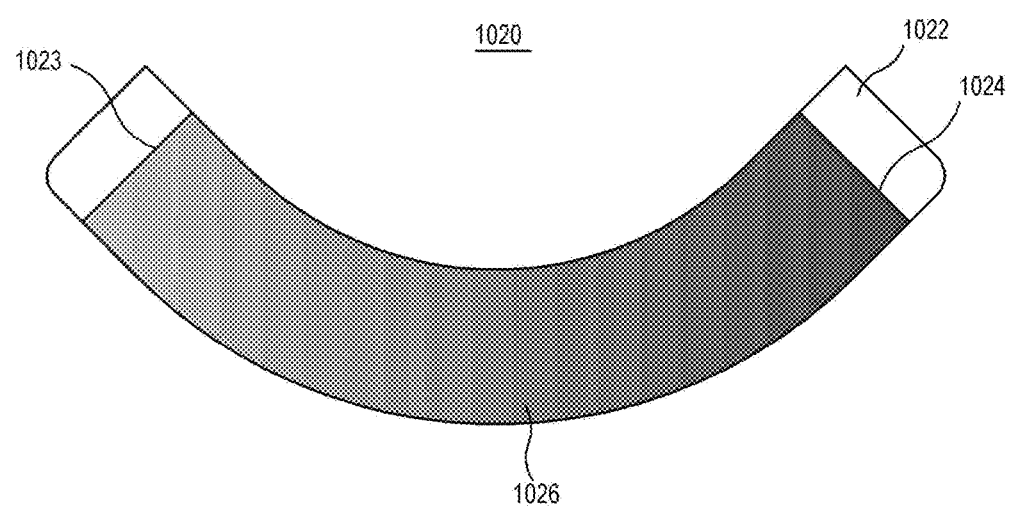
FIG. 10 is a top view of a swiveling indicator of a display apparatus according to an exemplary embodiment.

FIG. 10 is a top view of a swiveling indicator 1020 of a display apparatus 10 according to an exemplary embodiment.

Referring to FIG. 10, a swiveling indicator 1020 may have a color indicating surface 1026 varied in color tone from one end 1023 toward the other end 1024. Here, variation in color tone may refer to gradations in which color, brightness or chroma is gradually or stepwise changed.

The sensor 530 may include a color sensor to sense change in color tone of the swiveling indicator 1020 as the swiveled angle of the display 100 is changed. The color sensor may include a color filter, a photodiode, etc. and distinguish among the three primary colors, i.e. red, green and blue by measuring quantity of ambient light and color based on difference in intrinsic wavelength among colors, thereby outputting the measurement as an analog or digital value to the controller.

Thus, the color indicating surface 1026 of the swiveling indicator 1020 is used as the swiveling indication value corresponding to the swiveled angle of the display 100.

Figure 11:
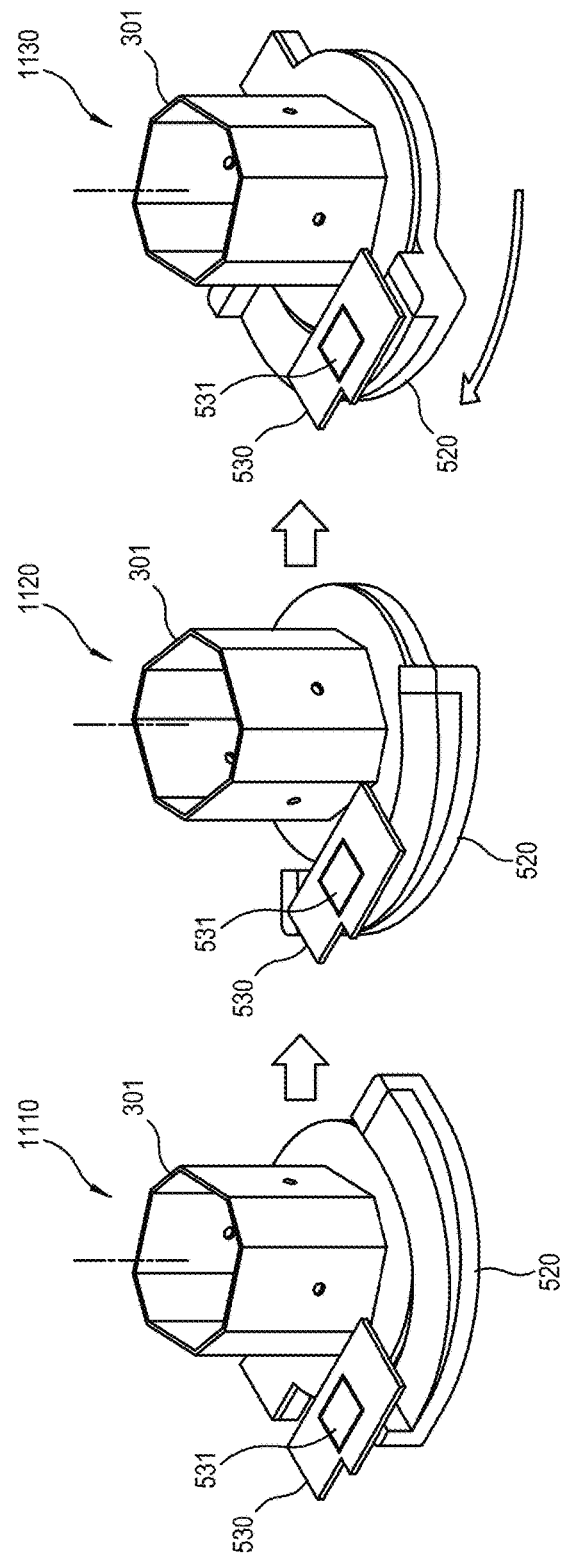
FIG. 11 illustrates that a display apparatus according to an exemplary embodiment is swiveled.

FIG. 11 illustrates that a display apparatus 10 according to an exemplary embodiment is swiveled.

Referring to FIG. 11, if the driver 300 swivels the display 100 from the swiveled angle of −A degrees 1110 to +A degrees 1130, the swiveling indicator 520 is swiveled together with the shaft 301 of the driver 300. In the exemplary embodiment, the sensor 530 is stationarily/fixedly mounted to the stand 300, but the exemplary embodiment is not limited thereto. Alternatively, the sensor may be swiveled as the display 100 is swiveled, and the swiveling indicator 520 may be stationarily mounted to the stand 300.

Figure 12:
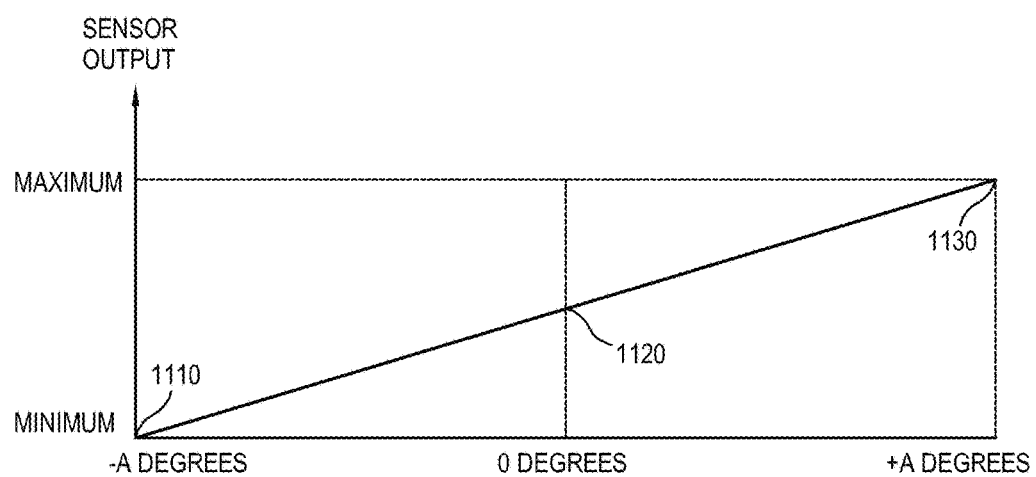
FIG. 12 illustrates an output value of a sensor as the display apparatus of FIG. 11 is swiveled.

FIG. 12 illustrates an output value of a sensor as the display apparatus of FIG. 11 is swiveled.

Referring to FIG. 12, the proximity sensor 531 of the sensor 530 senses change in distance from the slope indicating surface of the swiveling indicator 520 as the display 100 of FIG. 11 is swiveled from −A degrees 1110 to +A degrees 1130. That is, the sensor 530 outputs the minimum value at the swiveled angle of −A degrees 1110 and outputs the maximum value at the swiveled angle of +A degrees 1130.

Because the storage 160 is storing a table where the swiveled angles of the display 100 are tabulated matching to the output values of the sensor 530, it is possible to determine the swiveled angle of the display 100 based on the output value of the sensor 530. Further, if the sensor 530 outputs at least one between the minimum value and the maximum value, the controller 140 may determine that the display 100 cannot swivel anymore and thus control the driver 300 to stop swiveling.

Figure 13:
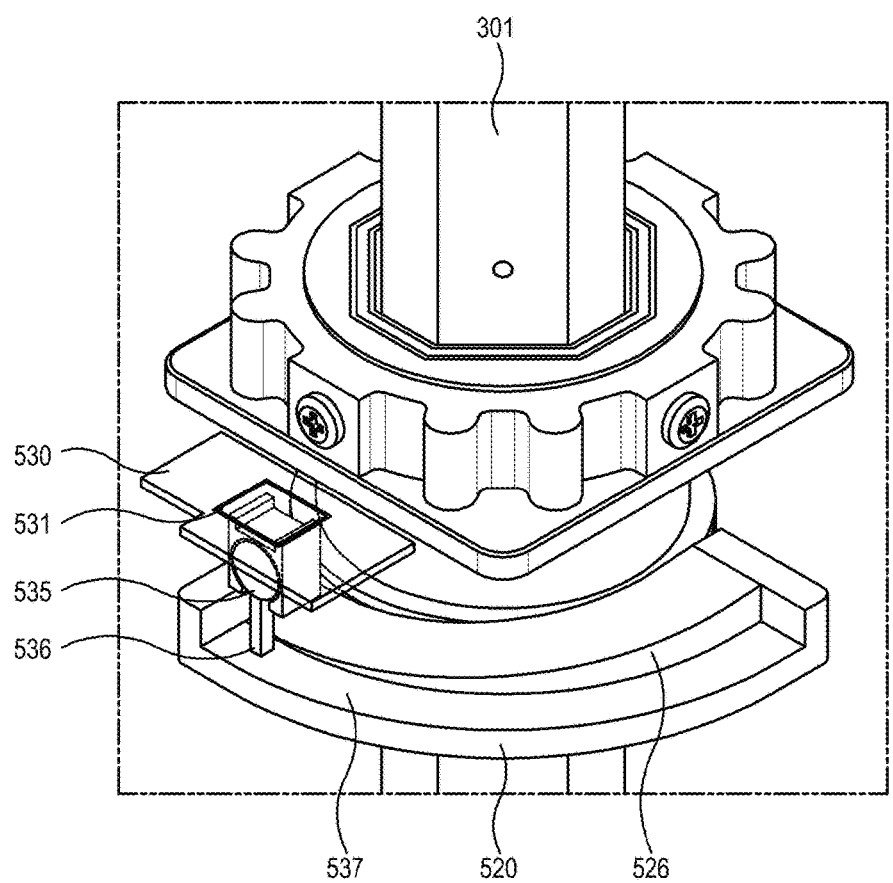
FIG. 13 is a perspective view of a swiveling indicator, a sensor and a stopper in a display apparatus according to an exemplary embodiment.

FIG. 13 is a perspective view of a swiveling indicator 520, a sensor 530 and a stopper 535 in a display apparatus according to an exemplary embodiment.

The sensor 530 includes a stopper 535 and a knob 536 to prevent the shaft 301 from limitless swiveling, and thus the swiveling indicator 520 includes a restrictor 537 to accommodate the knob 536 of the stopper 535.

If one end of the restrictor 537 contacts the knob 536 of the stopper 535 while the restrictor 537 is swiveled together with the shaft 301, the knob 536 is rotated and thus the sensor 530 senses that the knob 536 is rotated by the contact with the restrictor 537.

When the sensor 530 outputs a sensed signal to the controller 140, the controller 140 controls the driver 300 to stop swiveling the display 100, thereby preventing the swiveled angle of the display 100 from exceeding a predetermined swiveling range.

Figure 14:
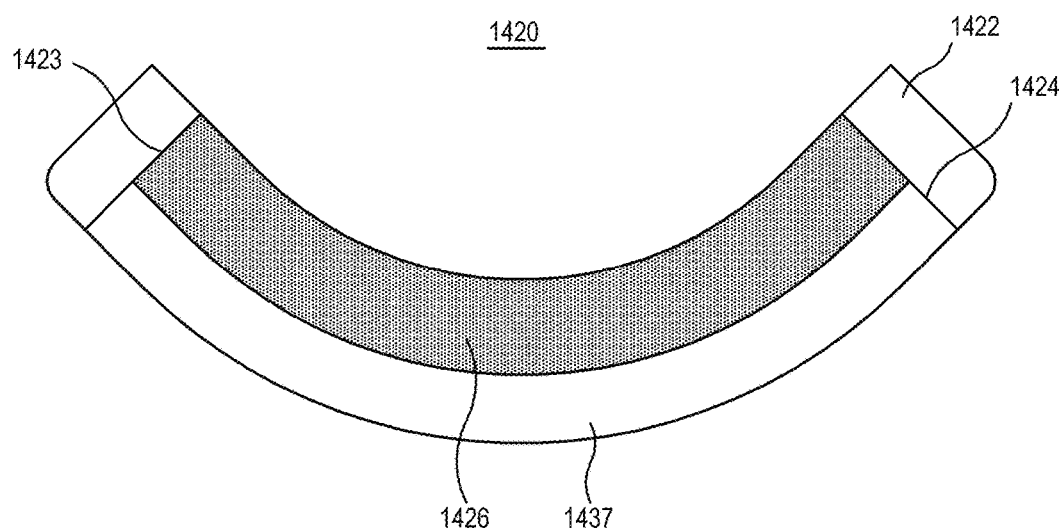
FIG. 14 is a top view of a swiveling indicator of a display apparatus according to an exemplary embodiment.

FIG. 14 is a top view of a swiveling indicator 1420 of a display apparatus 10 according to an exemplary embodiment.

Referring to FIG. 14, a swiveling indicator 1420 has a slope indicating surface 1426 connecting one end 1423 and one end 1424 of a second surface 1422, and additionally includes a restrictor 1437 for accommodating the knob 536 of the stopper 535.

At this time, a part of the sensor 530 may be provided to sense change in distance from the slope indicating surface 1426, and the other part may be provided to sense swiveling of the stopper 535.

Figure 15:
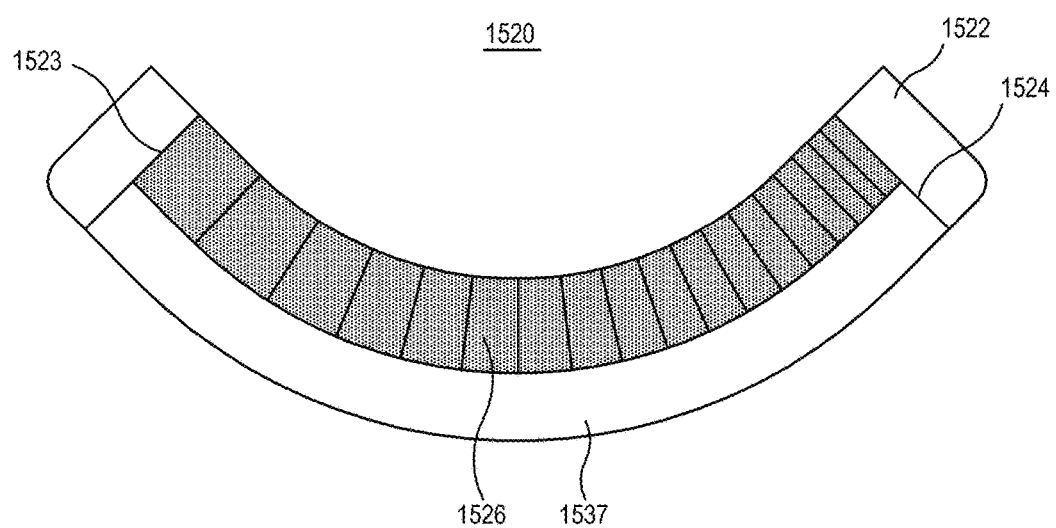
FIG. 15 is a top view of a swiveling indicator of a display apparatus according to an exemplary embodiment.

FIG. 15 is a top view of a swiveling indicator 1520 of a display apparatus 10 according to an exemplary embodiment.

A swiveling indicator 1520 may be shaped including a pitch indicating surface 1526, pitches of which become narrower from one end 1523 of a first surface 1521 toward the other end 1524 on the first surface 1521. For example, in the swiveling indicator 1520, a first pitch the closest to one end 1523 is wider than the next second pitch, and the second pitch is wider than the next third pitch P3. In addition, the swiveling indicator 1520 may further include a restrictor 1537 for accommodating the knob 536 of the stopper 535.

Figure 16:
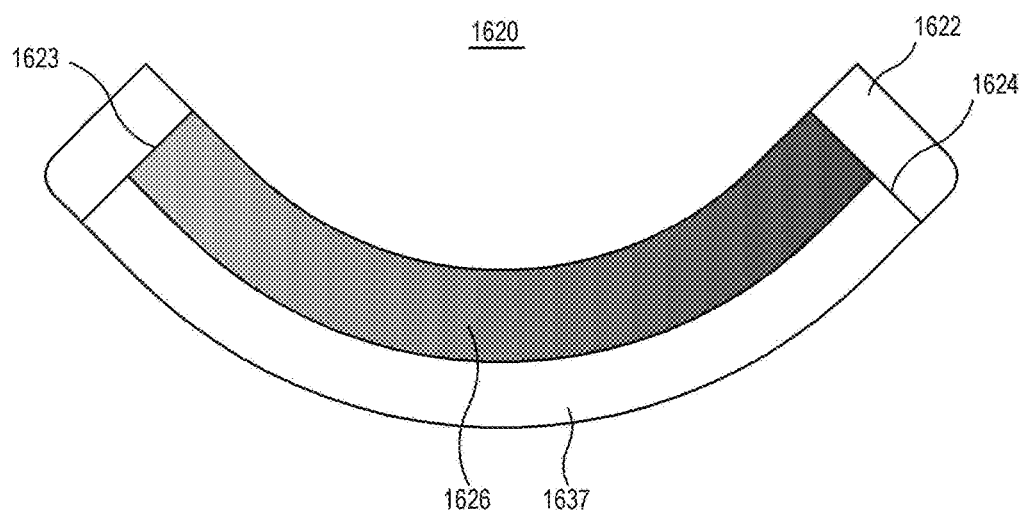
FIG. 16 is a top view of a swiveling indicator of a display apparatus according to an exemplary embodiment.

FIG. 16 is a top view of a swiveling indicator 1620 of a display apparatus 10 according to an exemplary embodiment.

A swiveling indicator 1620 may have a color indicating surface 1626 varied in color tone from one end 1623 toward the other end 1624. Here, variation in color tone may refer to gradations in which color, brightness or chroma is gradually or stepwise changed. The swiveling indicator 1620 may further include a restrictor 1637 for accommodating the knob 536 of the stopper 535.

Figure 17:
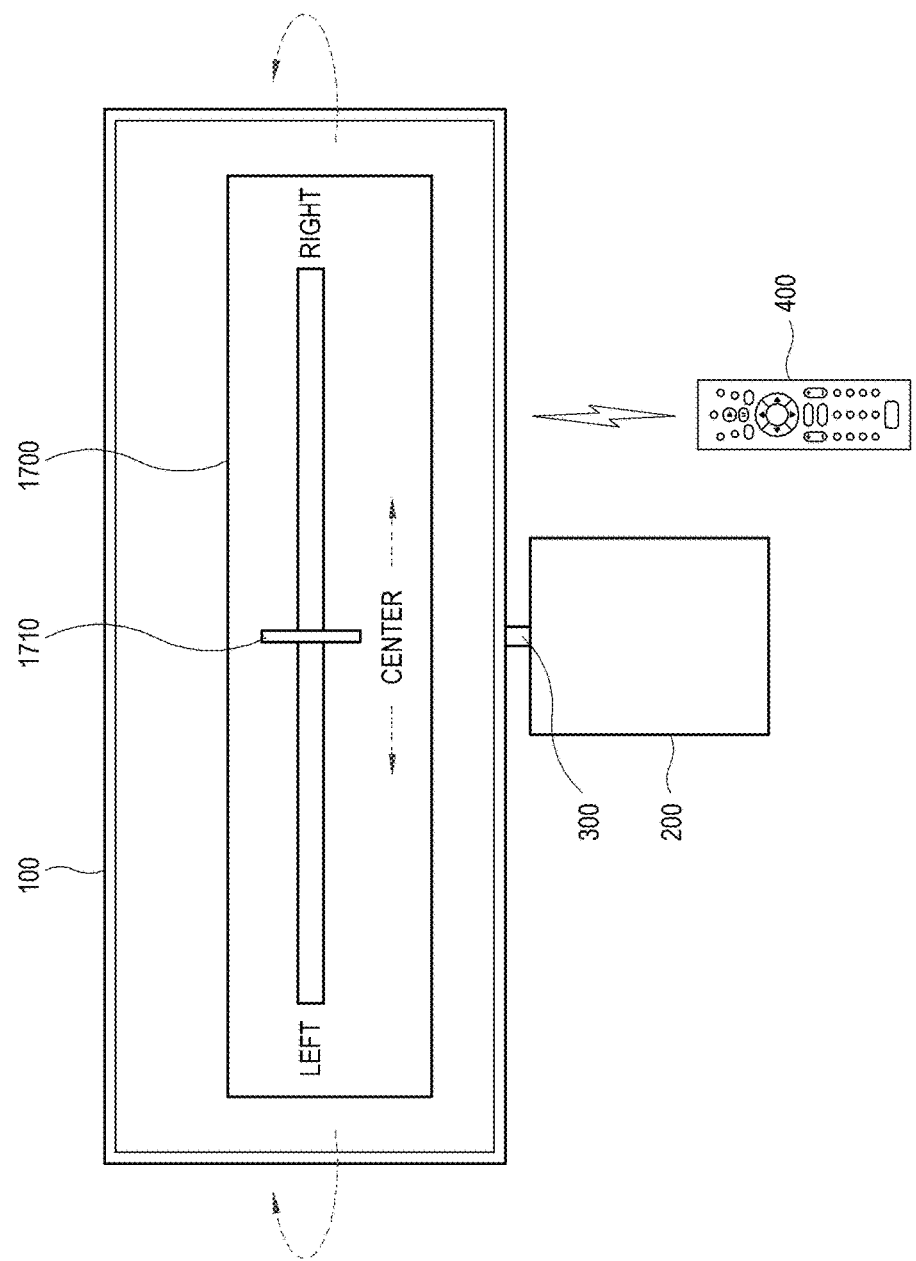
FIG. 17 is a front view of a display apparatus according to an exemplary embodiment.

FIG. 17 is a front view of a display apparatus 10 according to an exemplary embodiment.

Referring to FIG. 17, the display 100 of the display apparatus 10 may display a user interface 1700 for adjusting the swiveled angle of the display 100. The user interface 1700 includes an image and a text to show a swiveled direction and a swiveled angle, and a menu bar 1710 to adjust the swiveled angle. The display 100 may be achieved by a touch display panel, and thus the display apparatus 10 may receive a user's touch input through the input unit 150.

Further, the display apparatus 10 may control its swiveled angle as a separate remote controller 400 controls a menu bar 1710 to be moved. For example, if a user moves the menu bar 1710 rightward by +A degrees on the user interface 1700 through the remote controller 400, the display 1000 is swiveled in the counterclockwise direction from 0 degrees to +A degrees. Thereafter, if a user presses a reset button of the remote controller 400, the display 100 returns to the swiveled angle of 0 degrees.

Figure 18:
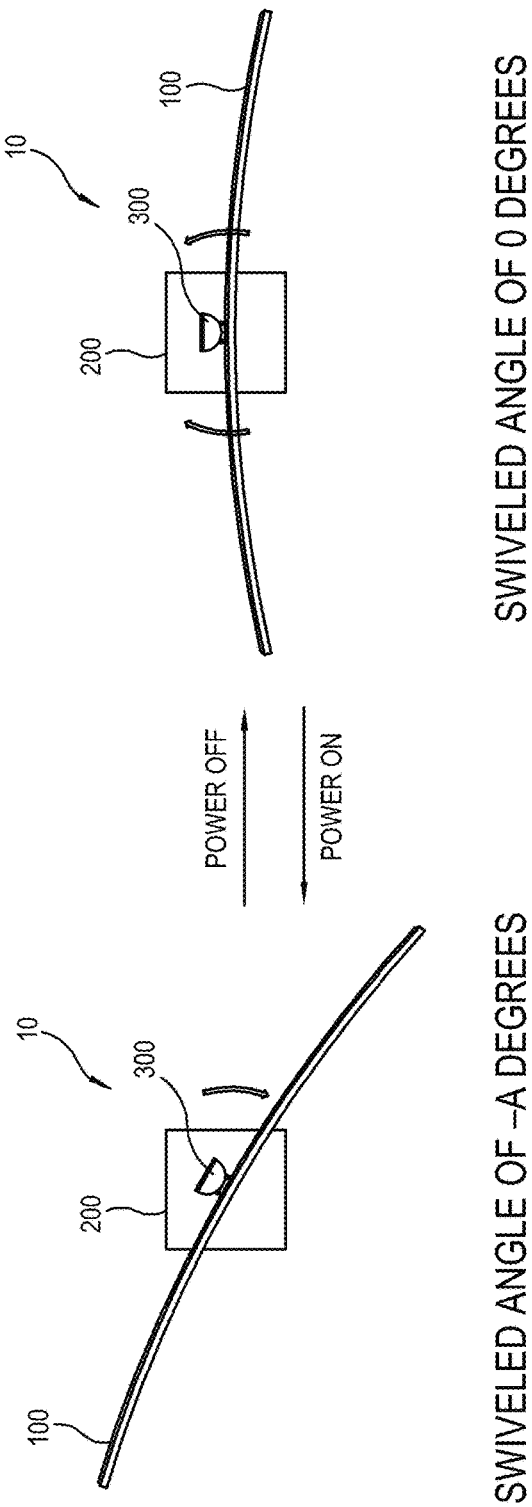
FIG. 18 illustrates that a display apparatus according to an exemplary embodiment is swiveled.

FIG. 18 illustrates that a display apparatus 10 according to an exemplary embodiment is swiveled.

If a user adjusts the swiveled angle of the display 100 to −A degrees on the user interface 1700, the display 100 is swiveled at an angle of −A in the clockwise direction. At this time, the controller 140 stores the swiveled angle −A degrees in the storage 160. If the display apparatus 10 is turned off, the display 100 may return to an initial position of 0 degrees. Thereafter, if the display apparatus 10 is turned on, the controller 140 controls the display 100 to swivel at the angle of −A degrees, which is stored in the storage 160.

Therefore, a user does not have to adjust the swiveled angle as desired whenever the display apparatus 10 is turned on, and does not have to return the swiveled angle to 0 degrees whenever the display apparatus 10 is turned off.

Figure 19:
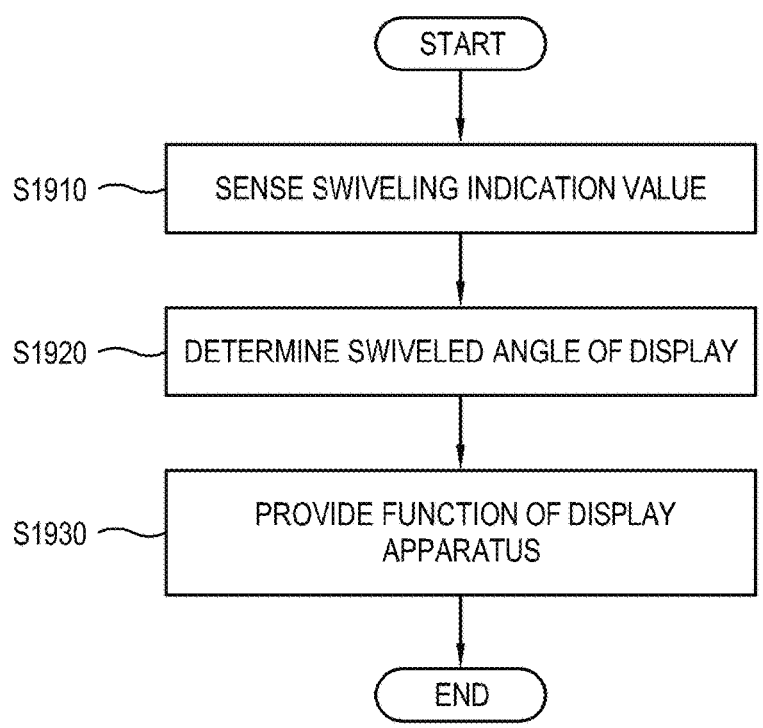
FIG. 19 is a flowchart of controlling a display apparatus according to an exemplary embodiment.

FIG. 19 is a flowchart of controlling a display apparatus 10 according to an exemplary embodiment.

Referring to FIG. 19, the display apparatus 10 senses the swiveling indication value of the shape corresponding to the swiveled angle of the display 100 that can swivel within a predetermined swiveling range with respect to the stand 200 (S1910). Here, the shape may include at least one of the slope indicating surface, the pitch indicating surface and the color indicating surface. Therefore, at least one of the slope indicating surface, the pitch indicating surface and the color indicating surface may be used as the swiveling indication value corresponding to the swiveled angle of the display 100.

The display apparatus 10 determines the swiveled angle of the display 100 based on the sensed swiveling indication value (S1920), and provides at least one of support functions in accordance with the determined swiveled angle (S1930).

Figure 20:
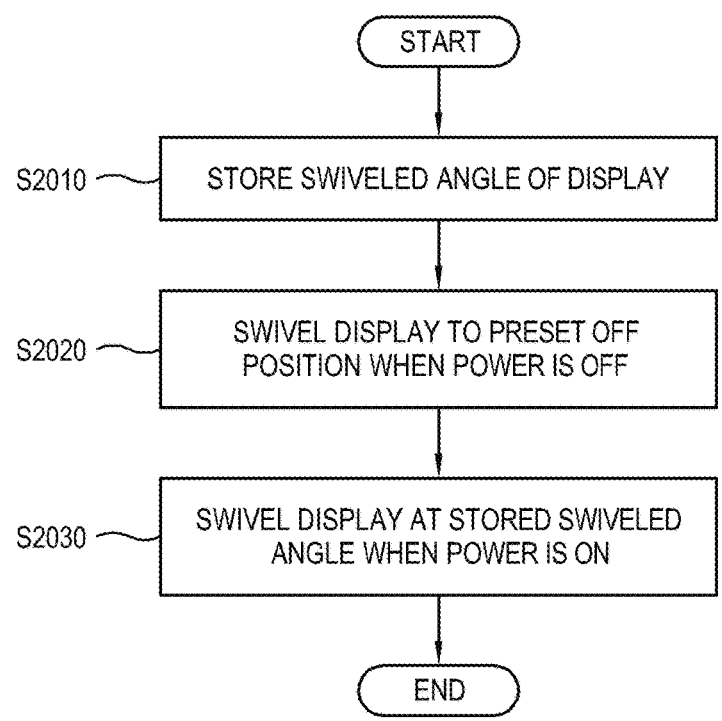
FIG. 20 is a flowchart of controlling a display apparatus according to an exemplary embodiment.

FIG. 20 is a flowchart of controlling a display apparatus 10 according to an exemplary embodiment.

Referring to FIG. 20, the display apparatus 10 stores the swiveled angle of the display 100, being currently viewed by a user, based on the swiveling indication value of the shape corresponding to the swiveled angle of the display 100 (S2010). Thereafter, if a user turns off the display apparatus 10, the display 100 is swiveled to a preset off position (S2020). Thereafter, if a user turns on the display apparatus 10, the display 100 is swiveled at the previously stored swiveled angle (S2030).

As described above, it is convenient for a user because the swiveled angle of the display is easily sensed and adjusted.

Although a few exemplary embodiments and drawings have been shown and described, it will be appreciated by those skilled in the art that various modifications and changes may be made in these exemplary embodiments without departing from the principles and spirit of the inventive concept. In particular, the proximity sensor used for determining the center of the shaft may be replaced by another sensor capable of measuring a distance. For instance, the proximity sensor may be replaced by an optical sensor, an ultrasonic sensor or an infrared sensor.

The operations according to the foregoing exemplary embodiments may be performed by a single controller. In this case, a program command for performing the operations to be implemented by various computers may be recorded in a computer readable medium. The computer readable medium may contain a program command, a data file, a data structure, etc. or combination thereof. The program command may be specially designed and made for the foregoing embodiments, or publicly known and available to those skilled in the art. As an example of the computer readable medium, there are a magnetic medium such as a hard disk drive, a floppy disk, a magnetic tape, etc. an optical medium such as a compact disc read only memory (CD-ROM), a digital versatile disc (DVD), a magnetic-optical medium such as a floptical disk, and a hardware device such as a read only memory (ROM), a random access memory (RAM), a flash memory, etc. specially configured to store and execute a program command. As an example of the program command, there is not only a machine code made by a compiler but also a high-level language code to be executable by a computer through an interpreter or the like. Therefore, the foregoing has to be considered as illustrative only. The scope of the inventive concept is defined in the appended claims and their equivalents. Accordingly, all suitable modification and equivalents may fall within the scope of the inventive concept of the disclosure.

What is claimed is:

1. A display apparatus comprising:
a display configured to be swiveled;
a stand configured to support the display;
a driver configured to swivel the display with respect to the stand;
a swiveling indicator provided within a predetermined swiveling range of the display and comprising a swiveling indication value gradually varying in a size or a height according to a swiveled angle of the display;
a sensor configured to sense the variation in the size or the height of the swiveling indication value of the swiveling indicator according to the swiveled angle of the display; and
a controller configured to determine the swiveled angle of the display based on the variation in the size or the height of the swiveling indication value sensed by the sensor and to provide at least one function supported by the display apparatus in accordance with the determined swiveled angle.

2. The display apparatus according to claim 1, wherein the swiveling indicator comprises a slope indicating surface, a height of the slope indicating surface varying within the predetermined swiveling range of the display, and
wherein the sensor is configured to sense the variation in the height of the slope indicating surface.

3. The display apparatus according to claim 1, wherein the swiveling indicator comprises a pitch indicating surface, a pitch of the pitch indicating surface varying within the predetermined swiveling range of the display, and
wherein the sensor is configured to sense the variation in the pitch of the pitch indicating surface.

4. The display apparatus according to claim 1, further comprising an input unit configured to receive an input for adjusting the swiveled angle of the display,
wherein the controller is configured to control the driver to swivel the display in accordance with the swiveled angle of the display corresponding to the input received by the input unit.

5. The display apparatus according to claim 4, wherein the display is configured to display a user interface for receiving the input for adjusting the swiveled angle of the display.

6. The display apparatus according to claim 1, further comprising a storage configured to store the swiveled angle of the display at a time when the display apparatus is turned off,
wherein the controller is configured to control the driver to swivel the display to a preset off position when the display apparatus is turned off, and to control the driver to swivel the display at the stored swiveled angle when the display apparatus is turned on.

7. A display apparatus comprising:
a display configured to be swiveled;
a stand configured to support the display;
a driver configured to swivel the display with respect to the stand;
a swiveling indicator provided within a predetermined swiveling range of the display and comprising a color indicating surface, color tone of the color indication surface varying within the predetermined swiveling range of the display according to the swiveled angle of the display;
a sensor configured to sense the variation in the color tone of the color indicating surface according to the swiveled angle of the display; and
a controller configured to determine the swiveled angle of the display based on the variation in the color tone of the color indicating surface sensed by the sensor and to provide at least one function supported by the display apparatus in accordance with the determined swiveled angle.

8. The display apparatus according to claim 7, further comprising an input unit configured to receive an input for adjusting the swiveled angle of the display,
wherein the controller is configured to control the driver to swivel the display in accordance with the swiveled angle of the display corresponding to the input received by the input unit.

9. The display apparatus according to claim 7, further comprising a storage configured to store the swiveled angle of the display at a time when the display apparatus is turned off, wherein the controller is configured to control the driver to swivel the display to a preset off position when the display apparatus is turned off, and to control the driver to swivel the display at the stored swiveled angle when the display apparatus is turned on.

10. A method of controlling a display apparatus comprising a display and a stand, the method comprising:
   sensing variation a size or a height of a swiveling indication value of a swiveling indicator, the swiveling indication value gradually varying in the size or the height according to a swiveled angle of the display to be swiveled within a predetermined swiveling range with respect to the stand;
   determining the swiveled angle of the display based on the sensed variation in the size or the height of swiveling indication value; and
   providing at least one function supported by the display apparatus in accordance with the determined swiveled angle.

11. The method according to claim 10, wherein the swiveling indicator comprises a slope indicating surface, a height of the slope indicating surface varying within the predetermined swiveling range of the display, and
   the sensing the variation comprises sensing the variation in the height of the slope indicating surface.

12. The method according to claim 10, wherein the swiveling indicator comprises a pitch indicating surface, a pitch of the pitch indicating surface varying within the predetermined swiveling range of the display, and
   the sensing the variation comprises sensing the variation in the pitch of the pitch indicating surface.

13. The method according to claim 10, further comprising receiving an input for adjusting the swiveled angle of the display,
   wherein the providing the at least one function comprises swiveling the display in accordance with the swiveled angle of the display corresponding to the received input.

14. The method according to claim 13, further comprising displaying a user interface for receiving the input for adjusting the swiveled angle of the display.

15. The method according to claim 10, further comprising storing the swiveled angle of the display at a time when the display apparatus is turned off,
   wherein the providing the at least one function comprises:
      swiveling the display to a preset off position when the display apparatus is turned off; and
      swiveling the display at the stored swiveled angle when the display apparatus is turned on.

16. A method of controlling a display apparatus comprising a display and a stand, the method comprising:
   sensing variation in color tone of indicating surface of a swiveling indicator, the color tone of the color indicating surface varying according to a swiveled angle of the display to be swiveled within a predetermined swiveling range with respect to the stand;
   determining swiveled angle of the display based on the sensed color tone color indicating surface according to the swiveled angle of the display; and
   providing at least one function supported by the display apparatus in accordance with the determined swiveled angle.

17. The method according to claim 16, further comprising receiving an input for adjusting the swiveled angle of the display,
   wherein the providing the at least one function comprises swiveling the display in accordance with the swiveled angle of the display corresponding to the received input.

18. The method according to claim 16, further comprising storing the swiveled angle of the display at a time when the display apparatus is turned off,
   wherein the providing the at least one function comprises:
      swiveling the display to a preset off position when the display apparatus is turned off; and
      swiveling the display at the stored swiveled angle when the display apparatus is turned on.

* * * * *